(12) United States Patent
Corfield (10) Patent No.: US 10,701,204 B2
(45) Date of Patent: Jun. 30, 2020

(54) ESTABLISHING TELEPHONE CALLS (71) Applicant: WONEFONE LLP, London (GB)

(72) Inventor: Geoffrey Corfield, London (GB)

(73) Assignee: WONEFONE LLP, London (GB)

(*) Notice: Subject to any disclaimer, the term of this patent is extended or adjusted under 35 U.S.C. 154(b) by 62 days.

(21) Appl. No.: 14/646,892

(22) PCT Filed: Nov. 21, 2013

(86) PCT No.: PCT/GB2013/053078
§ 371 (c)(1),
(2) Date: May 22, 2015

(87) PCT Pub. No.: WO2014/080208
PCT Pub. Date: May 30, 2014

(65) Prior Publication Data
US 2015/0304494 A1    Oct. 22, 2015

(30) Foreign Application Priority Data
Nov. 22, 2012  (GB) .................................. 1221081.1

(51) Int. Cl.
*H04M 11/00*         (2006.01)
*H04M 3/42*          (2006.01)
(Continued)

(52) U.S. Cl.
CPC .... *H04M 3/42357* (2013.01); *G07F 17/0028* (2013.01); *H04M 3/02* (2013.01);
(Continued)

(58) Field of Classification Search
CPC ..... H04W 36/14; H04W 36/30; H04W 92/02; H04W 4/16; H04W 12/06; H04W 12/08;
(Continued)

(56) References Cited

U.S. PATENT DOCUMENTS 7,417,988 B1 * 8/2008 Tripathi ............ H04M 3/42212
                                                      370/260
7,676,229 B2   3/2010 Albina et al.
(Continued)

FOREIGN PATENT DOCUMENTS

| EP | 1 345 397 A1 | 9/2003 |
| EP | 2 437 478 A1 | 4/2012 |
| WO | WO 2007/131269 A1 | 11/2007 |

OTHER PUBLICATIONS

Anonymous, UK Intellectual Property Office (UKIPO) (Cardiff, Wales), "Search Report" in application No. GB1221081.1, dated Mar. 18, 2013, 4 pages.
(Continued)

*Primary Examiner* — Joseph Arevalo
(74) *Attorney, Agent, or Firm* — Hickman Palermo Becker Bingham LLP (57) ABSTRACT

A method for establishing a telephone call between an originating device and a destination device. A call server receives an originating call made by an originating device to a dedicated number for a destination party. In response to receiving the originating call: (i) the originating call is parked; and (ii) a message is sent to the destination device of the destination party. The message informs the destination device of the originating call to the dedicated number so that the destination device is able to call the call server to be connected to the parked originating call.

21 Claims, 5 Drawing Sheets

120

| User name | User's dedicated telephone number | User's device number | User's extension |
|---|---|---|---|
| John Smith | 020 3****1 | 07905 7**** | 1000 |
| Fred Jones | 020 3******* | 07214 8****** | 1211 |
| James Brown | 020 3******* | 07248 1****** | 1094 |
| ... | ... | ... | ... |
| ... | ... | ... | ... |

(51) Int. Cl.
*H04W 76/10* (2018.01)
*H04W 76/12* (2018.01)
*H04M 15/00* (2006.01)
*H04M 3/50* (2006.01)
*G07F 17/00* (2006.01)
*H04M 3/02* (2006.01)
*H04M 3/436* (2006.01)
*H04M 3/533* (2006.01)
*H04W 4/24* (2018.01)
*H04M 3/428* (2006.01)

(52) U.S. Cl.
CPC ....... *H04M 3/42102* (2013.01); *H04M 3/436* (2013.01); *H04M 3/50* (2013.01); *H04M 3/533* (2013.01); *H04M 15/75* (2013.01); *H04M 15/8228* (2013.01); *H04M 15/88* (2013.01); *H04W 4/24* (2013.01); *H04W 76/10* (2018.02); *H04W 76/12* (2018.02); *H04M 3/428* (2013.01); *H04M 3/4211* (2013.01); *H04M 3/42374* (2013.01); *H04M 2203/2011* (2013.01); *H04M 2203/651* (2013.01); *H04M 2203/652* (2013.01); *H04M 2203/654* (2013.01); *H04M 2215/0116* (2013.01)

(58) Field of Classification Search
CPC ....... H04W 48/04; H04W 4/06; H04W 76/16; H04M 1/2535; H04M 1/67
USPC ......... 455/406, 413, 415, 405, 414.1, 432.1, 455/417, 411, 419, 466, 550.1, 410
See application file for complete search history.

(56) References Cited

U.S. PATENT DOCUMENTS

| | | | | |
|---|---|---|---|---|
| 8,189,535 B2* | 5/2012 | Akselsen | ............. | H04W 36/14 370/331 |
| 8,582,475 B1* | 11/2013 | Marghescu | ......... | H04M 3/5183 370/270 |
| 9,060,057 B1* | 6/2015 | Danis | ................ | H04M 3/42059 |
| 2006/0153353 A1 | 7/2006 | O'Neil | | |
| 2010/0020728 A1* | 1/2010 | Jefferson | ........... | H04M 3/42263 370/260 |
| 2010/0087182 A1* | 4/2010 | Stewart | .................... | H04M 1/57 455/419 |
| 2010/0205539 A1* | 8/2010 | Gestsson | ............. | G06Q 10/107 715/752 |
| 2010/0216435 A1* | 8/2010 | Martin | ................ | H04M 3/4281 455/414.1 |
| 2010/0226362 A1 | 9/2010 | Kim et al. | | |
| 2010/0329209 A1* | 12/2010 | Akselsen | .............. | H04W 36/14 370/331 |
| 2011/0182415 A1* | 7/2011 | Jacobstein | .......... | H04L 12/1818 379/202.01 |
| 2014/0063175 A1* | 3/2014 | Jafry | ...................... | H04M 1/67 348/14.02 |
| 2014/0106719 A1 | 4/2014 | Chitre et al. | | |
| 2015/0079936 A1* | 3/2015 | Gisby | .................... | H04L 63/10 455/411 |
| 2016/0337825 A1* | 11/2016 | Piscopo, Jr. | ............ | H04W 4/16 |

OTHER PUBLICATIONS

Anonymous, European Patent Office (EPO), Munich, Germany, "Search Report" in application No. PCT/GB2013/053078, dated Mar. 3, 2015, 15 pages.

Anonymous, European Patent Office (EPO), Munich, Germany, "Search Report" in application No. PCT/GB2013/053078, dated May 2014, 10 pages.

Anonymous, International Bureau of WIPO, Geneva, Switzerland, "Priority Document" in application No. PCT/GB2013/053078, dated Dec. 6, 2013, 1 page.

* cited by examiner

| User name | User's dedicated telephone number | User's device number | User's extension |
|---|---|---|---|
| John Smith | 020 3****1 | 07905 7**** | 1000 |
| Fred Jones | 020 3******* | 07214 8****** | 1211 |
| James Brown | 020 3******* | 07248 1****** | 1094 |
| ... | ... | ... | ... |
| ... | ... | ... | ... |

Fig. 4

| User's device number | IP Address | Status |
|---|---|---|
| 07805 7***** | 112..***.* | Available |
| 07214 8****** | 202.**.*.*** | Available |
| 07248 1**** | 96.*..* | Unavailable |
| ... | ... | ... |

ESTABLISHING TELEPHONE CALLS

FIELD

The present invention relates to establishing telephone calls. In particular, the present invention relates to a method for establishing a telephone call between an originating device such as a mobile phone and a destination device such as a mobile telephone.

BACKGROUND

Telephone calls can be made from an originating device to a destination device. These devices can be mobile phones (or "cell phones" in the US and elsewhere), landline phones or IP phones. Telephone calls can be expensive. In particular, although not exclusively, telephone calls between a phone in one country to a phone in a different country or between different provinces, states or regions within a country with multi area codes can be expensive. Telephoning a mobile phone in one country from a mobile phone in another country can be particularly expensive. For example, mobile phone tariffs from some UK service providers include charges of 92 p per minute to phone France from the UK, of 154 p per minute to phone the US from the UK and of 103 p per minute to phone Australia from the UK. In addition, mobile phone tariffs from some UK service providers include charges of 7 p per minute to receive calls on a UK mobile phone while in France, of 39 p per minute to receive calls on a UK mobile phone while in the US and of 43 p per minute to receive calls on a UK mobile phone while in Australia.

The present invention seeks to provide a new way of establishing a telephone call between an originating device and a destination device. More particularly, though not exclusively, the present invention seeks to provide a way of establishing a telephone call between users in different countries or in different provinces, states or regions within a country which can be used to provide a competitively priced service. More particularly still, though again not exclusively, the present invention seeks to provide a way of establishing a telephone call between a mobile phone in one country and a mobile phone in another country.

SUMMARY

According to an aspect of the present invention, there is provided a method for establishing a telephone call between an originating device and a destination device. The method comprises: receiving at a call server an originating call made by an originating device to a dedicated number for a destination party; and in response to receiving the originating call: (i) parking the originating call; and (ii) sending a message to the destination device of the destination party to inform the destination device of the originating call to the dedicated number so that the destination device is able to call the call server to be connected to the parked originating call.

The originating device can be any device capable of making a telephone call, including telecommunication devices such as mobile phones, landline phones and IP phones. Similarly, the destination device can be any device capable of making a telephone call, including telecommunication devices such as mobile phones, landline phones and IP phones. The devices can also be, for example, a personal computer, a laptop computer, a personal digital assistant (PDA), a portable/mobile internet device and/or some other electronic telecommunication device. The invention is particularly suitable, though not exclusively, for destination devices that are mobile phones.

The invention can be used by multiple users. Each user is given a dedicated telephone number. Such numbers are known in the art and can be referred to as Direct Dial-In (DDI) numbers or Direct Inward Dialing (DID) numbers. The dedicated number for each user is hosted or configured at a call server e.g. at a Private Branch Exchange (PBX). A user can be given more than one dedicated number. For example, a user can be given one dedicated number as an office number and another as a home number. Users can also be given different dedicated numbers for different countries so that someone wishing to phone them can use the number which is the cheaper to call. For example, a user can have a dedicated number with a United Kingdom (+44) code and a dedicated number with a United States of America (+1) code and someone wishing to phone them from the UK would use the UK number whereas someone wishing to phone them from the US would use the US number. The dedicated number(s) enable a third party (the "originating party") to originate a call to a user (the "destination party"). The originating party makes a call from their device (the "originating device"). The originating party may also have their own dedicated number or numbers hosted on the PBX, though this need not be the case.

Dedicated numbers such as DDI or DID numbers may be rented on a wholesale basis from many service providers. Such a number may be configured so that an originating call to the number will be connected to the device or facility to which the number is mapped. A number may be configured on the call server so that the call arrives at the call server and is parked by routing the call to a call parking facility at the call server.

In response to, or triggered by, receiving a call (the "originating call") from an originating device to a user's dedicated number, the call server parks the call at the call parking facility. The parking of the call may be effected through any suitable call parking facility on the call server or PBX. The call server also sends a message to the destination device of the destination party to inform the destination device a call to the user's dedicated number has been made. The message can be considered as an invitation or notification message to the destination party to call the call server to connect to the call made to the dedicated number. In response to receiving the message the destination party can accept the call by calling the call server to be connected to the parked originating call. If the message is a text message or the like, the destination party can accept the call by selecting a number in the body of the text message to call the call server. Alternatively, receipt of the message may initiate an inbound call experience on the destination device and the destination party by accepting the call causes the destination device to call the call server.

If a call (the "destination party call") from the destination device is made to the call server, the method may also comprise: receiving at the call server a destination party call from the destination device; and connecting the destination party call to the parked originating call to establish the telephone call between the originating device and the destination device.

The telephone number that the destination device uses to call the call server can be one that is charged at a preferential rate to the destination party. The preferential rate may be a local rate which is local to the destination party's location (e.g. country, region, province or state). For example, in the UK a local call number can begin with the +44 country code followed by a 1 or a 2. As another example, in North America the local number can begin with the +1 country code followed by a particular North America numbering plan area code. Depending on the service plan that the party has with their service provider, the charges for telephoning the local number may be included in the plan. The telephone number may be programmed into the destination device or may be provided in the message. The same telephone number may be used for multiple destination devices; that is, the number used by destination devices need not be dedicated numbers.

Accordingly, it can be seen that the cost to the originating and destination parties for the telephone call is the sum of the cost for the originating party to phone the call server plus the cost of the receiving party to call the call server plus the charge to use the service, which would typically be charged to the destination party as a charge for hosting the dedicated number on the call server. If local numbers are used for both the dedicated number and the number called by the destination device, the cost for the telephone call can be drastically reduced when compared to existing tariffs. This is particularly the case for international calls made from mobile to mobile, although savings may also be effected for calls to and from other types of phone. The invention can be used with all types of devices capable of making telephone calls. The invention is particularly suitable for use with destination devices in the form of mobile phones, and in particular smart phones, as smart phones may be programmed easily. However, it will be appreciated that landline and IP phones can also be programmed with the functionality needed to act as the destination device.

In addition to the other steps, the call server may also (i) identify an identifier of the destination device of the destination party and (ii) associate the identifier of the destination device with the parked originating call in response to receiving the originating call to the dedicated number for the destination party. The identifier of the destination device may be the telephone number (which may be referred to as the Caller ID (caller identification, CID), calling line identification (CLID), calling number delivery (CND), calling number identification (CNID) or calling line identification presentation (CLIP)) of the destination device, such as the mobile telephone number of the device. Some telephone services provide the caller name during the ringing signal and, as another option, the identifier may also include or be the caller name.

The identification of the destination device can be performed using a look-up table, database or other data structure held in memory of the call server. The data structure can contain, for each user, the dedicated number of the user/destination party associated with the identifier of their device (e.g. the device's telephone number). When the originating party call to the dedicated telephone number arrives at the call server, the call server can use the dedicated telephone number to look up the identifier of the destination party's device in the data structure.

The association of the identifier with the parked originating call can be performed by associating with the identifier of the destination device a pointer to the call parking facility (such as a particular conference bridge facility) that has been used to park the call. In certain embodiments, the call parking facility is a call or conference bridge facility such as a one-time use conference bridge (e.g. a one-time use call generated conference bridge which can be generated in response to a call being received at the call server). The pointer may be the number for the call parking facility (or other identifier of it) and may be temporarily included in the relevant entry of the data structure held in the memory of the call server (i.e. the entry for the destination device).

When a destination party call arrives at the call server, the telephone service provides the identifier (e.g. in the form of the destination device's telephone number or caller name) during the ringing signal. If the call has the identifier associated with the parked call, the call server connects the destination party call to that parked originating call. In certain embodiments when the pointer to the call parking facility is held in the entry of the data structure for the destination device, the call parking facility can be identified by using the number of the destination device to look up the pointer to the call parking facility in the relevant entry for the destination device.

Associating the identifier of the destination device with the parked originating call may be for a predetermined amount of time, for example up to 10 seconds, up to 20 seconds or up to 30 seconds. Accordingly, connecting the call having the identifier associated with the parked originating call is performed in dependence on a call with the corresponding identifier being received within the predetermined amount of time. Advantageously, this can protect against spoofing of Caller IDs as a call from a particular Caller ID will only be expected and successfully connected within a predetermined time from sending the message from the call server to the destination device.

If a call from the destination device is not received within the predetermined amount of time, the call server can route the parked originating call to a voice mail facility for the destination party. The voice mail facility may be hosted on the call server.

Optionally, the call server may send the message to the telephone number of the destination device. For example, the call server may send the message such as a text message (e.g. an SMS or MMS message) to the telephone number of the destination device.

Optionally, the call server may send the message as an email.

Optionally, the call server may send the message to an IP address of the destination device. Before sending the message, the call server may send a status enquiry, e.g. to a proxy server, to request the current status of the destination device and, if the response indicates that the destination device is available, the call server sends the message to the destination device. Suitably, the request and response can be sent across the internet, e.g. as HTTP messages. The proxy server may keep a record, for example in a look-up table, database or other data structure, of the status of the destination devices of the users. This record may be kept up to date by the proxy server independently of the requests from the call server. Alternatively or additionally, the proxy server may send a status request to the destination device and the destination device may return a status indication to the proxy server before the proxy server sends a response to the call server. Typically, the status enquiry from the call server to the proxy server contains the identifier of the destination device (which is typically the telephone number) and the response from the proxy server includes the availability status of the destination device and its current IP address. Suitably, the request and responses may be sent across the internet, e.g. as http messages.

If the response to the status enquiry indicates that the destination device is not available, the call server can route the call to the voice mail facility for the destination party.

If the message has been sent to the destination device and the receipt of the message has initiated an inbound call routine and the call is rejected, the device may send a corresponding call rejected indication to the call server. If a call rejected indication is received from the destination device, the call server can transfer the parked originating call to the voice mail facility for the destination party.

The message may include the telephone number (caller ID) of the originating device.

A further aspect of the present invention provides a computer-readable medium having computer-executable instructions adapted to cause a call server to perform any of the above methods.

Another aspect of the present invention provides a call server arranged to perform any of the above methods.

A further aspect of the present invention provides a method for a destination device of a destination party to establish a telephone call with an originating device. The method comprises: in response to receiving the message: initiating an inbound call experience on the destination device, wherein acceptance of the call causes the destination device to call the call server to be connected to a parked originating call. The inbound call experience may present an inbound call notification message on a display of the destination device which presents the option to accept or reject the inbound call. The inbound call experience may also play an inbound call ringtone. Rejection of the call may cause the destination device to send a call rejected notification to the call server.

The message may include the telephone number of the originating device. The telephone number and/or the caller's name may be displayed in the inbound call notification message.

The message may include the dedicated number that was called by the originating party. The dedicated number and/or its name may be displayed in the inbound call notification message.

For example, where a user has two or more dedicated telephone numbers—e.g. one for work and one for home—the number and/or the name such as "work" or "home" for the number may be displayed.

The destination party call may be made to a telephone number which is a local number for the destination device. The same telephone number may be used for multiple users.

A further aspect of the present invention provides computer-readable medium having computer-executable instructions adapted to cause a device to perform any of the above methods. These instructions may be provided in an application or "app".

Another aspect of the present invention provides a device configured to perform the method of any of the above methods.

Advantageously, embodiments of the present invention provide a new way of establishing a telephone call between an originating device and a destination device. Embodiments of the present invention can also provide an automated, real-time way to establish a telephone call between an originating device and a destination device in which users have a normal call experience. Embodiments of the present invention have particular, though not exclusive, application for making telephone calls to mobile phones in other countries. Users of the invention may benefit from the flexibility afforded by using a mobile phone, but with the costs of making and/or receiving calls being significantly reduced on even eradicated altogether.

Other aspects and features of the present invention will be appreciated from the following description and the accompanying claims.

BRIEF DESCRIPTION OF THE DRAWINGS

Embodiments of the present invention will now be described, by way of example only, with reference to the accompanying drawings in which like reference numerals are used to depict like parts. In the drawings.

DETAILED DESCRIPTION OF EMBODIMENTS

Figure 1:
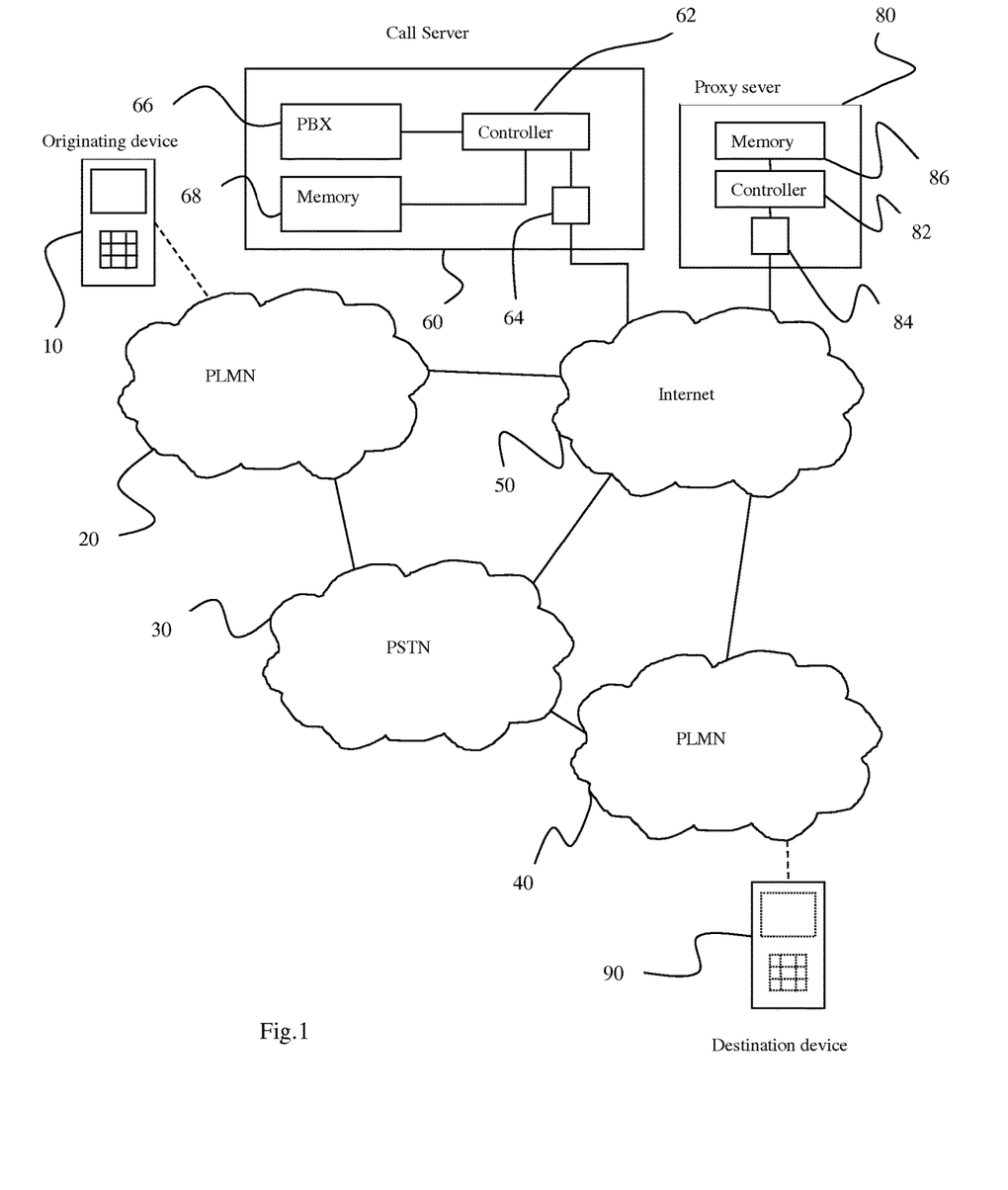
FIG. 1 is a schematic block diagram of an overall system including a call server, a proxy server, an originating device and a destination device.

FIG. 1 is a schematic block diagram of an overall system including a call server 60, a proxy server 80, an originating device 10 and a destination device 90. The call server 60 comprises a controller 62 connected to a communications adapter 64 which connects the call server to the internet 50. The controller 64 is connected to a Private Branch eXchange (PBX) 66 and memory 68. The proxy server 80 also comprises a controller 82 which is connected to a communications adapter 84 which connects the proxy server to the internet 50. The controller 84 is connected to a memory 86.

The originating device 10, which in the illustrated example is a mobile phone, is connected to a Public Land Mobile Network (PLMN) 20. The PLMN 20 is connected to the internet 50 for data communication and is also connected to a Public Switched Telephone Network (PSTN) 30 for voice communication. The PSTN 30 is also connected to the internet 50 for voice over IP communication.

The destination device 90, which in the illustrated example is a mobile phone, is connected to another Public Land Mobile Network (PLMN) 40. The PLMN 40 is connected to the internet 50 for data communication and is also connected to PSTN 30 for voice communication. The PLMN 40 could be connected to a different PSTN which in turn is connected to the PSTN 30, but for simplicity only one PSTN has been depicted.

Figure 2:
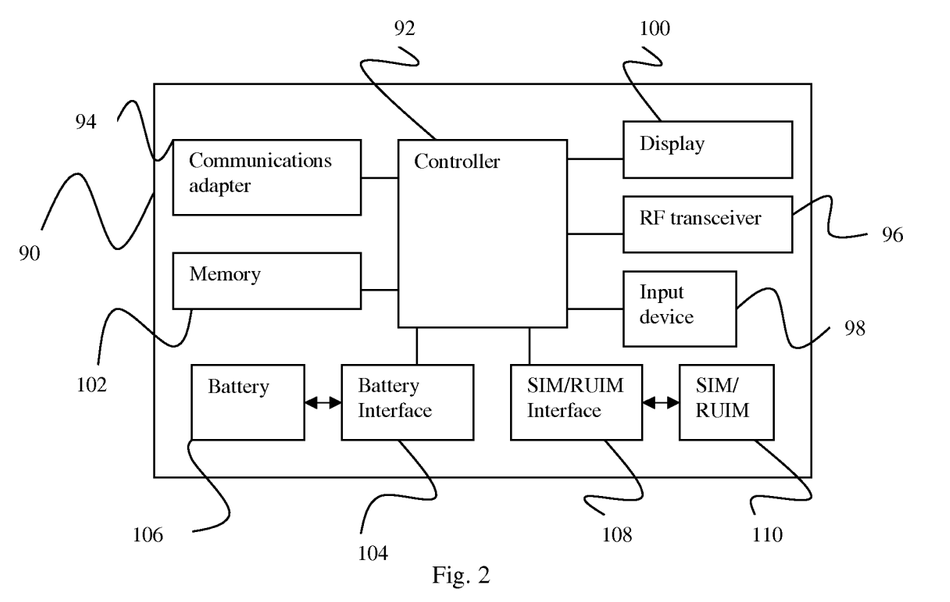
FIG. 2 is a schematic block diagram of a destination device.

FIG. 2 is a schematic block diagram of the destination device 90. The device 90 comprises a controller 92 connected to a battery interface 104 and a Subscriber Identity Module (SIM)/Removable User Identify Module (RUIM) interface 108. The battery interface 104 connects to battery 106 for powering the device. The SIM/RUIM interface 108 connects to SIM/RUIM card 110. The controller 92 is also connected to a display 100 and an input device 98. The input device may be a dedicated keypad or a touch screen. The controller is also connected to a memory 102 for storing data and programs including applications or "apps" which can be executed by the processor. The controller is also connected to a communications adapter 94 for enabling the device to connect to the internet and a radio frequency (RF) transceiver 96 for communicating with the PLMN.

Figure 3:
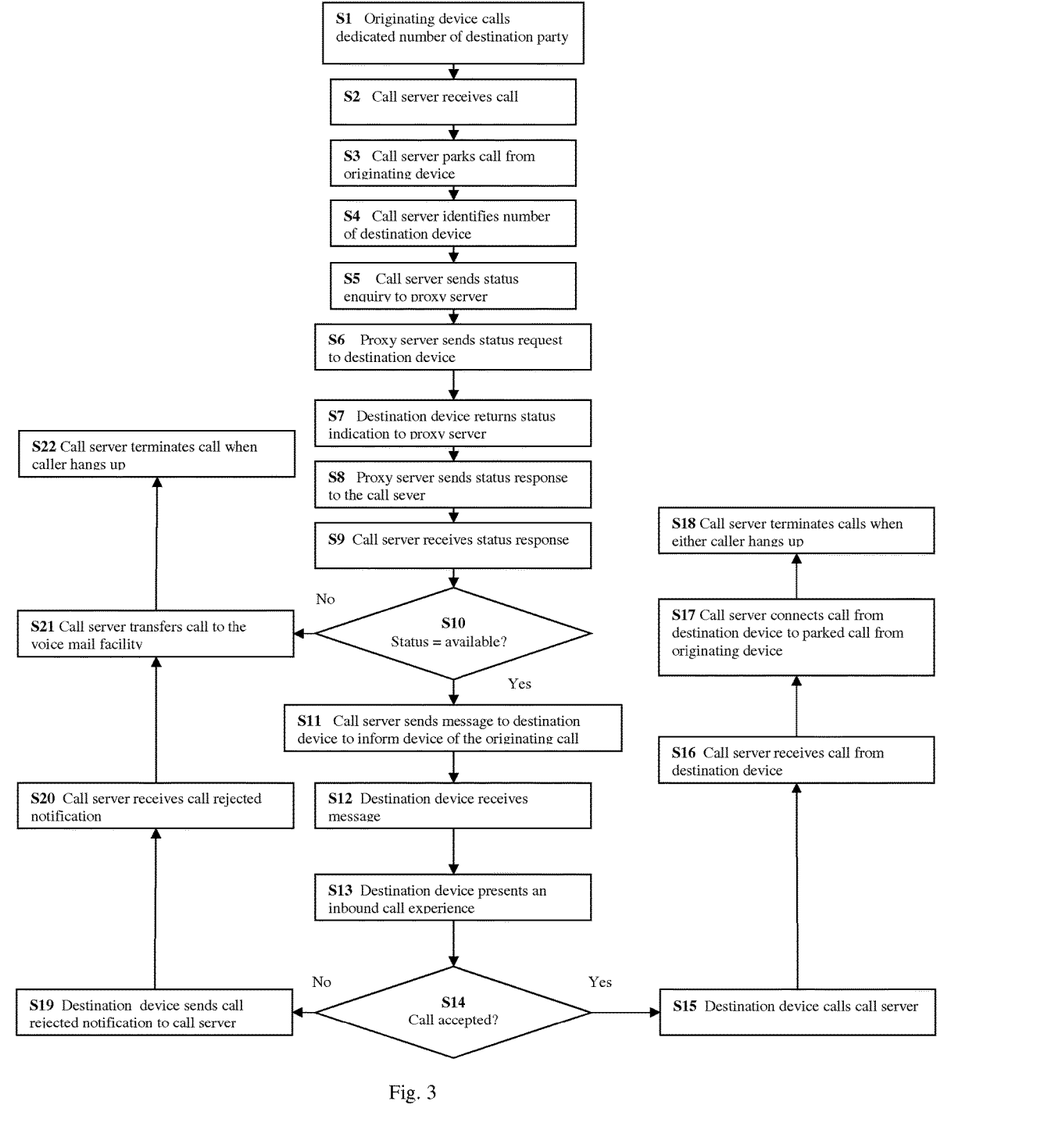
FIG. 3 is a flow chart of the operations which are performed to establish a telephone call between an originating device and a destination device.

FIG. 3 is a flow chart of the operations which are performed to establish a telephone call between the originating device and the destination device. Referring to FIG. 3, at step S1 a call is made from an originating party's device 10 to a destination party's dedicated number which is hosted on the call server 60. At step S2, the call server receives the call. At step S3 the call server parks the originating call in a call parking facility.

The call server plays a dialling tone to the originating party.

Figure 4:
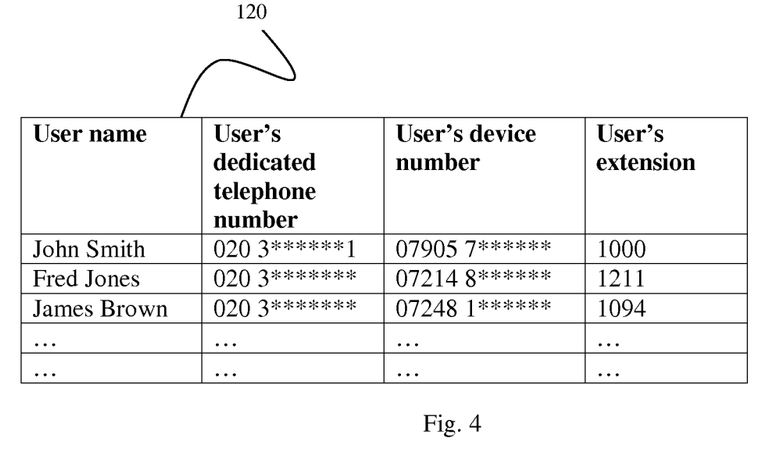
FIG. 4 is a table of data stored in the memory of the call server.

The call server 60 has a data structure such as table 120 of FIG. 4 stored in its memory 68. Data for a plurality of users is stored. In the illustrated table, for each user, the User's name (the destination party's name), the User's dedicated telephone number (the destination party's dedicated telephone number), the User's device number (the destination party's device number) and the User's extension on the PBX are stored. To avoid providing real telephone numbers, the numbers in the drawing are depicted with asterisks in place of actual numerals.

As can be seen from FIG. 4, user John Smith has the dedicated number 020 3\*\*\*\*\*\*1 and his device's telephone number is 07905 7\*\*\*\*\*\*\*. His extension number on the PBX is extension 1000. Details are also shown for two other users, though the actual system would contain the corresponding details for many users.

Referring back to FIG. 3, at step S4 the call server uses its controller 62 to identify the number of the destination device by referring to the table 120 and using the dedicated telephone number that has been called to identify the corresponding number of the destination device. For example, if the dedicated telephone number 020 3\*\*\*\*\*\*1 of John Smith was called, the call server would use the number 020 3\*\*\*\*\*\*1 in table 120 to identify the corresponding device's number as 07905 7\*\*\*\*\*\*\*.

The parked call is associated with the telephone number of the destination party's device by associating a pointer to the call parking facility (i.e. an identifier of the call parking facility such as its number) with the number of the destination device. In one implementation, the pointer is included as an entry (not shown) in the table of FIG. 4 associated with the number of the destination device. In one particular implementation, the call parking facility is a call or conference bridge which is generated when the call is received and when the originating caller dials the user's dedicated number, the call or conference bridge is generated and the pointer to the bridge is created and associated with the number of the destination device in table 120. In such an implementation the call or conference bridge may be a one-time-use bridge.

At Step S5, the call server sends a status enquiry as an HTTP message across the internet 50 to the proxy server 80 to request the current status of the destination device and its current IP address. The status enquiry contains the telephone number of the destination device.

Figure 5:
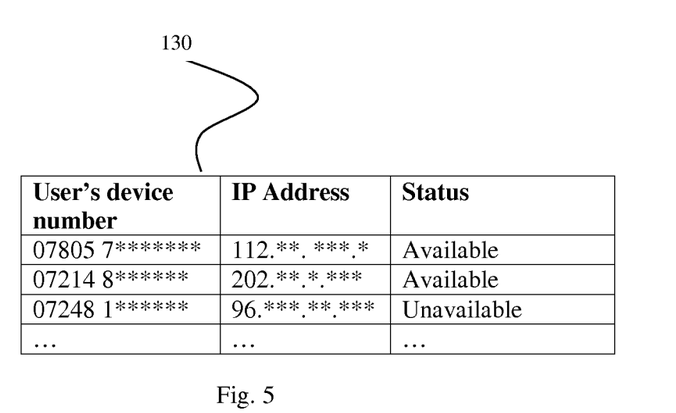
FIG. 5 is a table of data stored in the memory of the proxy server.

The proxy server 80 has a data structure such as table 130 of FIG. 5 stored in its memory 86. The table contains a record of the status of the destination devices of the users. The status of each device is "available" if the device is able to accept a call. The status of the device is "unavailable" if the device is unable to accept a call. The "unavailable" status may have various sub-statuses such as "busy" or "out of coverage". The table also contains the current or most up to date IP address of each device. In the illustrated table, for each user, the user's device number, its IP address and its status are stored. For example, the IP address of 07905 7\*\*\*\*\*\*\* (John Smith's device's number) is stored and its status is "available". Details are also shown for two other users, though the actual system would contain the corresponding details for many users.

The proxy server 80 keeps the IP address and status information in table 130 up to date using approaches commonly used in presence technologies such as instant messaging (IM) e.g. Skype.

At step S6, the proxy server sends a status request to the destination device identified by its telephone number in the status enquiry received from the call server 60. To do this, the proxy server 80, using its controller 82, reads the telephone number from the status enquiry and looks up the current IP address of the device in the table 130 stored in memory 86. The proxy server then sends the status request as an HTTP message to the destination device at that IP address. The destination device 90 receives the status request and at step S7 it returns a status indication to the proxy server 80. The status indication is returned as an HTTP message and contains the status of the device 90. The proxy server 80, using its controller, 82, reads the status from the status indication and updates the table 130. The proxy server also sends the status response to the call server 60. The status response is sent as an HTTP message and contains the status of destination device 90 and its IP address.

At step S9, the call server receives the status response and at step S10 checks the status of the destination device 90. If the status of the destination device 90 is "available", at step S11 the call server 60 sends a message to the destination device 90 to inform the device that the originating call has been made to the dedicated telephone number. To do this, call server 60 using its controller 62 sends an HTTP message to the destination device 90 across the internet 50. The message includes the telephone number of the originating device.

Figure 6:
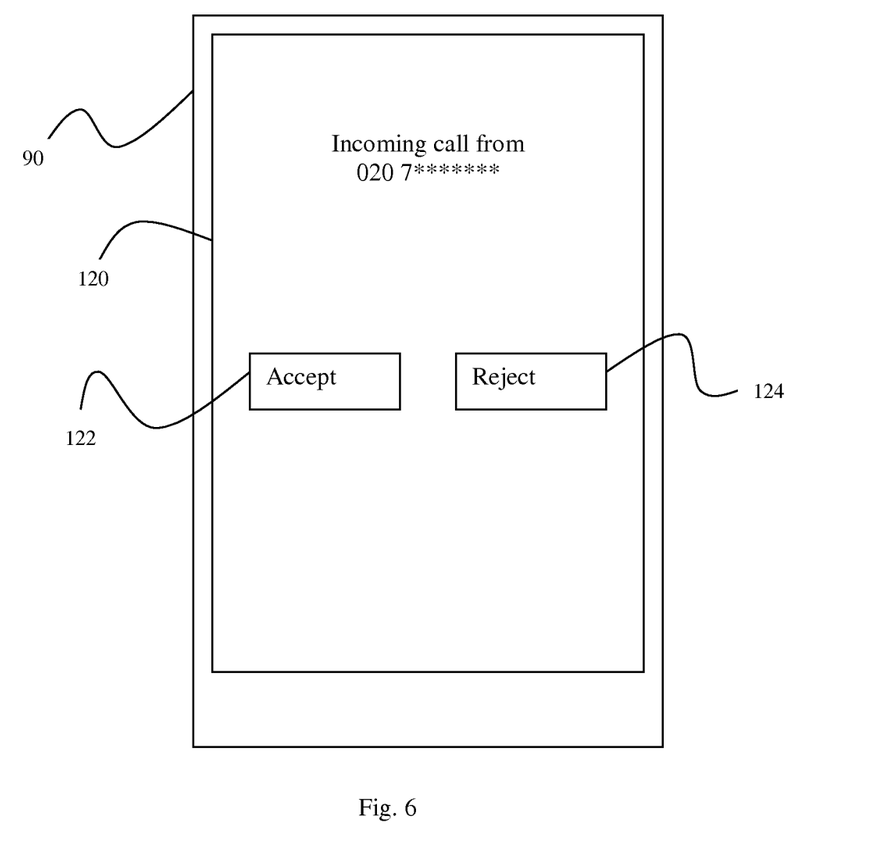
FIG. 6 illustrates an inbound call experience on a destination device.

At step S12, the destination device 90 receives the message. In response to, or conditional on, receiving the message the destination device 90 initiates an inbound call experience. The destination device 90 does this, using its controller 92, to present an inbound call notification message 120 on its display 100. The inbound call notification message 120 on the display of device 90 is illustrated in FIG. 6. With reference to FIG. 6, the message 120 is presented on a touch screen and displays the telephone number of the originating device. The message also presents an Accept soft button 122 and a Reject soft button 124 on the touch screen. The message may also inform the user that acceptance of the call will cause the device to call a call server to be connected to the originating call.

At step S14, the user of the destination device either accepts or rejects the call by selecting the Accept button 122 or the Reject button 124, respectively. Selection of the Accept button 122 at step S15 causes the destination device 90 to call the call server 60. The destination device 90 calls the call server by the controller 92 causing the call to be made over PLMN 40.

At step S16, the call server 60 receives the call from the destination device 90. When a destination party call arrives at the call server, the telephone service provides the destination device's telephone number as part of the signal. The call server checks to see if a parked call on the call server has that telephone number associated with it, and if such a parked call exists the call server connects the destination party call to that parked originating call. In the implementation where the pointer to the call parking facility is associated with the number of the destination device in table 120, the table can be used to look up the pointer to the call parking facility and the call is routed to the call parking facility. The call or connection between the originating device and the destination device is established.

At step S18, when either party hangs up the call server 60 terminates the calls. Terminating the call involves terminating the calls from the call parking facility (e.g. by dissolution of the one-time-use bridge) as well as the clearing down of all associated resources to their idle state.

Referring back to step S10, if the status of the destination device 90 is unavailable then at step S21 the call server 60 transfers the originating call to a voice mail facility for the destination party which is hosted on the PBX 66. S21 is also performed after a predetermined amount of time which may for instance be configured to 30 seconds (has elapsed since the time at which the originating call was received at step S2. In other words, a "time out" procedure is provided.

Referring back to step S14, if the call is rejected through selection of the Reject button 124, then at step S19 the destination device sends a call rejected notification to the call server 60. The notification is sent as an HTTP message. At step S20 the call server receives the notification and at step S21 the call server 60 transfers the originating call to the voice mail facility for the destination party. Step S21 may also be performed after a predetermined amount of time 30 seconds has elapsed since the time at which the message was sent at step S12. In other words, another "time out" procedure is provided.

The caller may leave a message on the voice mail facility and when the caller hangs up the call server 60 terminates the call at step S22. Terminating the call involves terminating the calls from the call parking facility (e.g. by the dissolution of the one-time-use bridge) as well as the clearing down of all associated resources to their idle state.

In certain embodiments, rather than sending the message as an HTTP message the message is sent to the destination device, for example as a text message (e.g. email SMS or MMS message). The text message may contain a link which a user can select to call the call server. This means that only steps S1 to S4, S11, S12 and S16-S18 may be performed in such embodiments.

In certain embodiments, one or more users have a plurality of dedicated numbers. For example, one number can be used for "work" and another for "home". The dialled dedicated number may be included in the message and displayed in the inbound call notification message.

In certain embodiments, the originating device and/or the destination device may be land line or VOIP devices.

In certain embodiments, other details such as address details and billing details are stored in table 120.

In certain embodiments, all of the functionality described as being performed on the call server and proxy server may be performed by the call server or carried out on one server or distributed across multiple servers. For example, Session Internet Protocol (SIP) or switch to mobile technologies may be used at the call server or at a proxy server.

In certain embodiments the PBX may be an IP PBX. In certain embodiments the PBX may be a Time Division Multiplexing (TDM) PBX.

The controller of the devices described herein can include a processor and optionally a memory. The communications adapters of the devices and servers can be one or more wired and/or wireless data connections, such as connections conforming to one or more known information exchange standards, such as wired Ethernet, wireless 802.11x (Wi-Fi), high-speed packet access (HSPA), worldwide interoperability for microwave access (WiMAX), Ultra-wideband (UWB), wireless local area network (WLAN), Universal Serial Bus (USB), Bluetooth®, infrared or the like. The memory of the devices and servers can be, for example, a read-only memory (ROM); a random-access memory (RAM) such as, for example, a magnetic disk drive, and/or solid-state RAM such as static RAM (SRAM) or dynamic RAM (DRAM); and/or FLASH memory or a solid data disk (SSD).

The processor can be any of a variety of processors. Such processors can be implemented, for example, as hardware modules such as embedded microprocessors, microprocessors as part of a computer system, Application-Specific Integrated Circuits (ASICs), and Programmable Logic Devices (PLDs). Such processors can also be implemented as one or more software modules.

Certain embodiments described herein relate to a computer-readable medium which includes a non-transitory computer-readable medium (also can be referred to as a non-transitory processor-readable medium) having computer-executable instructions or computer code thereon for performing various computer-implemented operations. The non-transitory computer-readable medium (or processor-readable medium) is non-transitory in the sense that it does not include transitory propagating signals such as a propagating electromagnetic wave carrying information on a transmission medium.

The above embodiments have been described by way of example only, and the described embodiments are to be considered in all respects only as illustrative and not restrictive. It will be appreciated that variations of the described embodiments may be made without departing from the scope of the invention which is indicated by the appended claims rather than by the foregoing description.

The invention claimed is:

1. A method for establishing a telephone call between an originating device and a destination device, the method comprising:
   receiving at a call server an originating call made by an originating device to a dedicated number for a destination party;
   in response to receiving the originating call:
   (i) parking the originating call; and
   (ii) sending an invitation message to the destination device of the destination party via any of HTTP, email, SMS or MMS to inform the destination device of the originating call to the dedicated number and to invite the destination device to call the call server to allow the call server to connect the destination device call to the parked originating call;
   receiving at the call server a destination party call from the destination device; and
   connecting the destination party call to the parked originating call to establish the telephone call between the originating device and the destination device.

2. A method according to claim 1, wherein the destination party call is made to a telephone number which is charged at a preferential rate to the destination party.

3. A method according to claim 1, further comprising, in response to receiving the originating call to the dedicated number for the destination party:
   (i) identifying an identifier of the destination device of the destination party; and
   (ii) associating the identifier of the destination device with the parked originating call.

4. A method according to claim 3, wherein connecting the destination party call to the parked originating call comprises receiving a call having the identifier and connecting the call with the identifier to the parked originating call.

5. A method according to claim 4, wherein associating the identifier of the destination device with the parked originating call is for a predetermined amount of time and wherein connecting the call with the identifier to the parked originating call is performed in dependence on a call with the identifier being received within the predetermined amount of time.

6. A method according to claim 5, comprising routing the parked originating call to a voicemail facility for the destination party if a call from the destination device is not received within the predetermined amount of time.

7. A method according to claim 3, wherein the identifier is the telephone number of the destination device.

8. A method according to claim 1, comprising, before sending the message to the destination device, making a status enquiry to enquire of the current status of the destination device and, if the status of the destination device is available, sending the message to the destination device, optionally wherein, if the response to the status enquiry indicates that the destination device is not available, routing the call to a voicemail facility for the destination party.

9. A method according to claim 1, wherein receipt of the message by the destination device initiates an inbound call experience on the destination device in which acceptance of the call causes the destination device to call the call server to be connected to the parked originating call, optionally wherein if an indication is received from the destination device that the call has been rejected, transferring the parked originating call to a voicemail facility for the destination party.

10. A method according to claim 1, wherein the message is sent to one of an IP address and a telephone number of the destination device.

11. A method according to claim 1, wherein the message includes the caller ID of the originating device.

12. A non-transitory computer-readable medium having computer-executable instructions adapted to cause a call server to perform the method of claim 1.

13. A call server arranged to perform the method of claim 1.

14. A method according to claim 1, the message being configured to initiate an imitation inbound call experience at the destination device, the imitation inbound call experience being an imitation of an inbound call experience at the destination device and comprising an acceptance actuator, wherein actuation of the acceptance actuator causes the destination device to call the call server to be connected to the parked originating call.

15. A method for a destination device of a destination party to establish a telephone call with an originating device, wherein an originating call from the originating device to a dedicated number for the destination party has been parked at a call server and wherein an invitation message has been sent from the call server to the destination device via any of HTTP, email, SMS or MMS to inform the destination device of the originating call to the dedicated number and to invite the destination device to call the call server to be connected to the parked originating call, the method comprising:

in response to receiving an invitation message: initiating an inbound call experience on the destination device, wherein acceptance of the call causes the destination device to call the call server to be connected to the parked originating call.

16. A method according to claim 15, wherein at least one of:

rejection of the call causes the destination device to send a call rejected notification to the call server; the destination party call is made to a telephone number which is a charged at a preferential rate to the destination party; and the inbound call experience plays an inbound call ringtone.

17. A method according to claim 15, wherein the inbound call experience presents an inbound call notification message on a display of the destination device which presents the option to accept or reject the inbound call.

18. A method according to claim 15, wherein the message includes the caller ID of the originating device and wherein the inbound call experience presents an inbound call notification message on a display of the destination device, the method comprising displaying the caller ID in the inbound call notification message.

19. A non-transitory computer-readable medium having computer-executable instructions adapted to cause a device to perform the method of claim 15.

20. A device configured to perform the method of claim 15.

21. A method for establishing a telephone call between an originating device and a destination device, the method comprising:

receiving at a call server an originating call made by an originating device to a dedicated number for a destination party, the dedicated number being hosted or configured at the call server;

in response to receiving the originating call:
(i) parking the originating call; and
(ii) sending an invitation message to the destination device of the destination party via the internet to inform the destination device of the originating call to the dedicated number and to invite the destination device to make a separate, new destination party call to the call server to allow the call server to connect the separate, new destination party call to the parked originating call;

receiving at the call server the separate, new destination party call from the destination device; and connecting the destination party call to the parked originating call to establish the telephone call between the originating device and the destination device.

* * * * *